United States Patent
Waddington et al.

(10) Patent No.: US 7,805,714 B2
(45) Date of Patent: Sep. 28, 2010

(54) TECHNIQUE FOR CONSTRUCTING SYNTAX-DIRECTED SEARCH AND MODIFICATIONS IN PROGRAM TRANSFORMATION SYSTEMS

(75) Inventors: Daniel G. Waddington, Tinton Falls, NJ (US); Bin Yao, Middletown, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1270 days.

(21) Appl. No.: 11/093,518

(22) Filed: Mar. 30, 2005

(65) Prior Publication Data

US 2006/0230378 A1 Oct. 12, 2006

(51) Int. Cl.
*G06F 9/45* (2006.01)

(52) U.S. Cl. ............ 717/143; 717/141; 717/142; 717/144

(58) Field of Classification Search .......... 717/141–144
See application file for complete search history.

(56) References Cited

U.S. PATENT DOCUMENTS

| | | | |
|---|---|---|---|
| 5,946,488 A | 8/1999 | Tanguay et al. | |
| 6,029,002 A * | 2/2000 | Afifi et al. | 717/131 |
| 6,427,228 B1 | 7/2002 | Wigger | |
| 6,542,906 B2 | 4/2003 | Korn | |
| 6,668,325 B1 | 12/2003 | Colberg et al. | |
| 7,117,488 B1 * | 10/2006 | Franz et al. | 717/144 |
| 7,228,529 B2 | 6/2007 | Bera | |
| 2002/0059469 A1 * | 5/2002 | Gray et al. | 709/310 |
| 2003/0084424 A1 | 5/2003 | Reddy et al. | |
| 2003/0149689 A1 * | 8/2003 | Chow et al. | 707/3 |
| 2003/0182572 A1 | 9/2003 | Cowan et al. | |
| 2004/0230886 A1 | 11/2004 | Livshits | |
| 2005/0039173 A1 | 2/2005 | Tondreau et al. | |
| 2005/0251533 A1 * | 11/2005 | Harken et al. | 707/104.1 |
| 2006/0212859 A1 * | 9/2006 | Parker et al. | 717/143 |

OTHER PUBLICATIONS

Burson et al., "A Program Transformation Approach to Automating Software Re-engineering", 1990, IEEE pp. 314-322.*
I. D. Baxter et al., "DMS: Program Transformations for Practical Scalable Software Evolution," Proceedings, 2004 International Conference on Software Engineering, May 2004.
J. R. Cordy et al., "The TXL Programming Language," Version 10.4, Software Technology Laboratory, School of Computing, Queen's University at Kingston, Kingston, Ontario, Canada, Jan. 2005.

(Continued)

*Primary Examiner*—Wei Y Zhen
*Assistant Examiner*—Junchun Wu
(74) *Attorney, Agent, or Firm*—Wall & Tong, LLP

(57) ABSTRACT

A front end component and a technique are provided. The front end component allows a transformation rule writer to specify syntax structure of interest, as well as what action to take when a syntax structure of interest is found. Example syntax structures include function call, variable declaration, math expression, etc. Typical actions include matching, replacement, or copying. The technique allows transformation tool writers to translate the specification into actual query and manipulation commands on the program representation. It is structured to be target language agnostic and, therefore, can be easily re-targeted to different programming languages.

25 Claims, 5 Drawing Sheets

OTHER PUBLICATIONS

Mario Latendresse, "Fast Symbolic Evaluation of C/C++ Preprocessing Using Conditional Values," IEEE 2003, Proceedings of the Seventh European Conference on Software Maintenance and Reengineering (CSMR'03).

Marian Vittek, "Refactoring Browser with Proprocessor," 2003 IEEE Computer Society.

A. Zeller, "Configuration Management with Version Sets," Technische Universitat Braunschweig, Apr. 1997.

J. Buffenbarger, "Syntactic Software Merging," Boise State University.

* cited by examiner syntax_search = syntax_name ': match_action syntax_name = string match_action = match_action

| match_actions' , match_actions

| match_actions = '{match_crits'}

| '{match_crit'}'<match_attrs'> match_crit = match_crit

| match_crit' , match_crits match_crit = '='$id

| '='*id

| ' 'string

| '$id

| '*id match_attrs = match_attr

| match_attr' , match_attrs match_attr = string

FIG. 1

TECHNIQUE FOR CONSTRUCTING SYNTAX-DIRECTED SEARCH AND MODIFICATIONS IN PROGRAM TRANSFORMATION SYSTEMS

CROSS-REFERENCES

The present application is related to copending applications "A Method for Handling Preprocessing in Source Code Transformation", and "A Method for Performing Conditionalized N-Way Merging of Source Code", which were filed on the same date as the present application. These copending applications are incorporated herein by reference in their entireties.

FIELD OF THE INVENTION

The present invention relates generally to the field of program transformation and program analysis and, in particular, relates to a technique for constructing syntax-directed search and modifications in program transformation systems.

BACKGROUND OF THE INVENTION

Program transformation systems need to support searching and manipulation of syntax structure (e.g., function definition, loop, variable declaration, etc.). Program formats (i.e., white spaces and comments) need to be preserved in an unchanged portion of transformed programs. To achieve these goals, a program transformation system needs to use program representations that record both syntax and formatting information of programs. Such representations are more complex than those used in program analysis tools or compilers, where only syntax information is needed. This added complexity and the need to preserve format information make it difficult to construct syntax-directed search and manipulations. There is a need for a technique for constructing search and manipulation operations that hides the complexity of the program representation and formatting preservation from transformation writers, allowing them to concentrate on syntax information.

One existing approach allows for query and manipulation of specified syntax structure. It allows matching on every syntax structures in languages, such as C, C++, Java, etc. If format information needs to be preserved, it must be explicitly described in the match and manipulation clause, making it more difficult to program transformations. Another existing approach allows search and replacement of specified code segments rather than individual syntax structures. It enables format preservation, but does not allow explicit syntax directed search and manipulations.

SUMMARY

Various deficiencies of the prior art are addressed by the present invention of a technique for constructing syntax-directed search and modifications in program transformation systems.

One aspect is a method for constructing syntax-directed search and modifications in program transformation systems. A language specified by a grammar is compiled into an executable. The language includes commands for specifying searching, matching, and modifying operations on a source code representation using a syntax structure specification. A search is performed based on the syntax structure specification and matrch criteria by matching every occurrence of a syntax name, when only the syntax name is specified in the syntax structure specification. A reference to a matched structure is optionally provided. Another aspect is a computer-readable medium having instructions stored thereon for performing this method.

Yet another aspect is a system for constructing syntax-directed search and modifications in program transformation systems, including a front end and a translation component. The front end component receives a syntax structure specification and an action to take when the syntax structure is found in a program representation. The translation component performs a method of translating the syntax structure specification into query and manipulation commands on the program representation.

BRIEF DESCRIPTION OF THE DRAWINGS

The teachings of the present invention can be readily understood by considering the following detailed description in conjunction with the accompanying drawings, in which:

FIG. 1 shows an exemplary syntax for a front end;

To facilitate understanding, identical reference numerals have been used, where possible, to designate identical elements that are common to the figures.

DETAILED DESCRIPTION OF THE INVENTION

Figure 2:
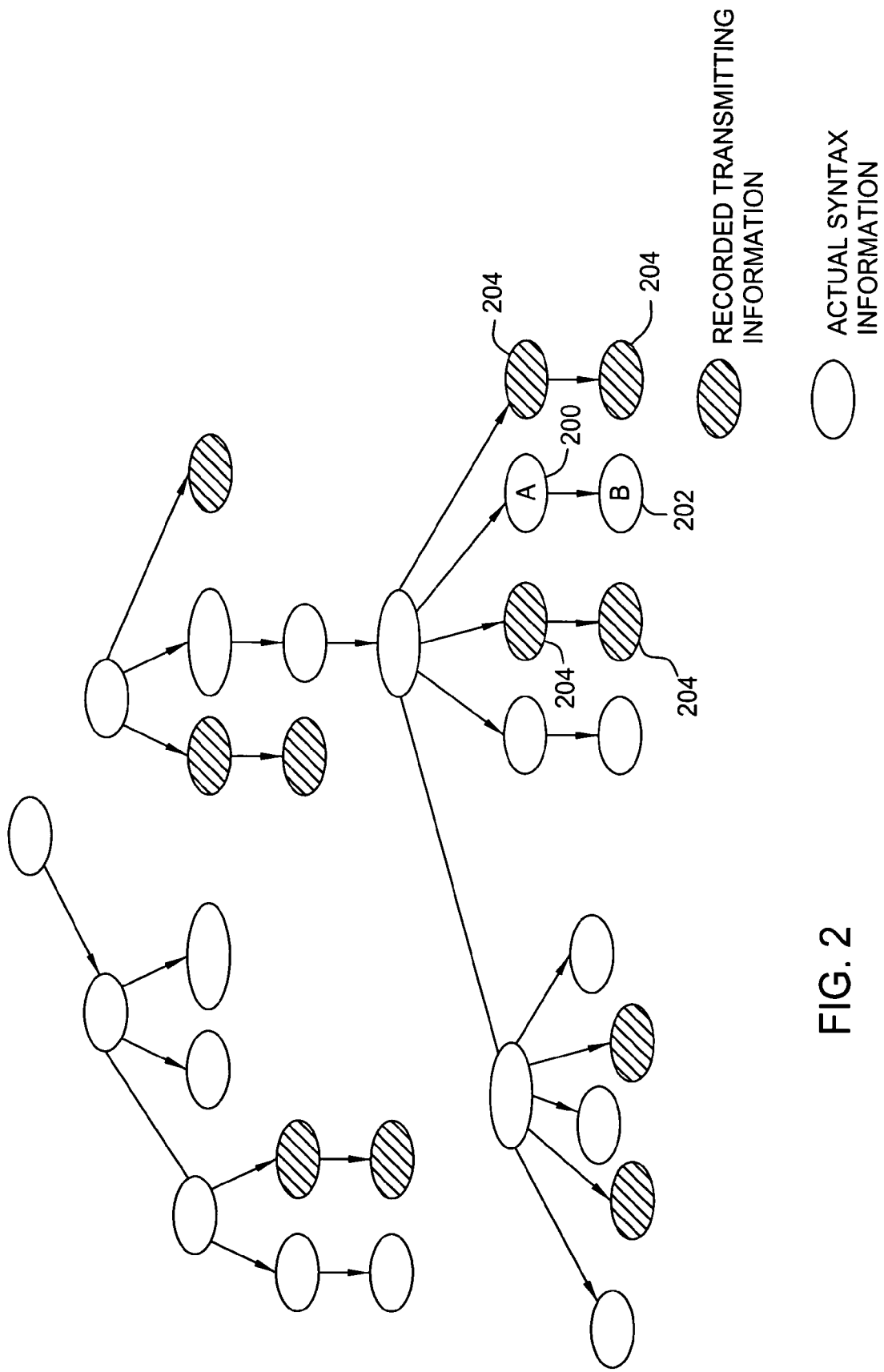
FIG. 2 shows a source code representation to be searched and modified using an exemplary technique.

The invention will be primarily described within the context of a technique for constructing syntax-directed search and modifications in program transformation systems, however, those skilled in the art and informed by the teachings herein will realize that the invention is also applicable to any program transformation and program analysis, meta-processing, automated transformation tools, tools for writers of transformation rules, tools for writers of transformation systems, preprocessors, postprocessors, manually performed steps, partially automated and partially interactive or manual steps, instructions in software or firmware components storable in the memory of and executable on many different kinds of computing machines, such as a personal computer (PC) with an operating system, such as Linux, application program interfaces (APIs), debugging, profiling, software porting, software executable on multiple platforms, prototyping, software environments, and many other different kinds of applications.

An exemplary embodiment includes a front end component and a technique. The front end component allows a transformation rule writer to specify syntax structure of interest, as well as what action to take when a syntax structure of interest is found. Example syntax structures include function call, variable declaration, math expression, etc. Typical actions include matching, replacement, or copying. The technique allows transformation tool writers to translate the specification into actual query and manipulation commands on the program representation. It is structured to be target language agnostic and, therefore, can be easily re-targeted to different programming languages.

Specification of Syntax Directed Search

FIG. 1 shows the following syntax for the exemplary front end, which allows transformation rule writers to specify a syntax-based search.

```
syntax_search = syntax_name ': match_actions
syntax_name = string
match_actions = match_action
              | match_action ': match_actions
              |
match_action = '{match_crits'}
              | '{match_crit'}'<match_attrs'>
match_crits = match_crit
              | match_crit', match_crits
match_crit = '='$id
              | '='*id
              | ''string
              | '$id
              | '*id
match_attrs = match_attr
              | match_attr', match_attrs
match_attr = string
```

This grammar is expressed in a type of Backus-Naur Form (BNF), which is a notation used to describe the productions of a context-free grammar. Of course, any other notation and substantially similar or equivalent expressions of this grammar are within the contemplation of the present invention. Obviously, various symbols, such as "$" could be replaced by different symbols, such as "&" and still function in the same way.

Syntax_name is the name given to the syntax structure. For example, FunctionCall is the name of a syntax structure that represents a function call. Similarly, SimpleDecl represents the declaration of a variable, e.g. int c; in C. If only syntax_name is specified, a search matches every occurrence of the specified syntax structure in the program.

Match_crit allows transformation rule writers to impose limitations on the search and to obtain a copy or reference of the matched structure. For example, the following clause FunctionCall: {'foo} matches only calls to function foo. Additionally, FunctionCall: {'foo, =$x, =*y} makes a copy of the corresponding syntax structure and stores it in variable $x and assigns a reference of the structure to *y. This enables easy tracking of multiple search results.

A syntax structure typically includes multiple fields. For example, the representation of a function call includes components that represent the function name as well as parameters. We use match_attrs to enable transformation rule writers to specify the component of interest. We also allow more flexible matching schemes than an exact match, which is also done through match_attrs. Transformation writers specify the way in which a particular match_crit is to be searched. The list of possible searches is flexible and includes once, right-most, left most, etc. The default value is an exact match. Some example match clauses are listed below:

FunctionCall: {'foo, =$x, =*y}
VarDecl: {=$x}<type>, {=$y}<decl>
TypeSpec:{=$x, 'int}<type>

Specification of Syntactical Structures Manipulation

After locating the appropriate syntax structure through one or multiple searches, transformation rule writers specify that the structure is to be replaced by another syntax structure. This exemplary embodiment provides two ways to achieve this. The first approach is to locate the desired syntax structure through a series of searches and then immediately replace it with another one.

Below is an example that replaces calls to foo with calls to bar.

```
search( FunctionCall:{'foo}){
    new(FunctionCall: {'bar});
}
```

The second approach is through reference variables. Once a reference is assigned, it can be replaced with another syntax structure by an on clause as listed below.

```
on *p {
    new(FunctionCall: {'bar});
}
```

In this case, the structure referenced by *p is changed into a function call to bar.

The syntax used for creating the new syntactical structure is similar to that of the search. The syntax also allows easy specification of particular syntax structures, components of a structure, as well as exact values of these components, which can be string, variable or reference. Some examples are listed below.

new(FunctionCall: {$x} )
new(VarDecl: {$x}<type>, {$y}<decl>)
new(TypeSpec:{'int}<type>)

Translating from Search and Manipulation Specification to Actual Implementation An exemplary translation technique has two properties: atomicity and format information transparency. Atomicity means that if multiple criteria are specified for a search, no side effects occur, unless all criteria are met. Match criteria may have multiple components and each component may have assignment to variables and/or references. Atomicity guarantees that no assignment occurs, unless all match criteria are satisfied at all specified components. Format information transparency enables preservation of formatting information in the program representation without explicit specification.

Atomicity is achieved by translating the specified search criteria into a back-end language which support some form of atomicity. The back-end language may be any language, such as stratego that provides atomicity support in the form of a congruence operator. The stratego congruence operator allows atomic match and assignment to multiple components of the same syntax structure. For each syntax structure that is of potential interest to transformation rule writers, the program representation of the syntax structure is analyzed and sub-fields of interest to the rule writers are selected. Function names in function calls, variable IDs in variable declarations, etc, are a few examples of useful sub-fields. This exemplary embodiment allows rule writers to specify match_actions on these fields and translate specified actions into appropriate stratego commands and apply them to corresponding fields.

FIG. 2 shows an example source code representation, such as an abstract syntax tree (AST). Formatting information is represented by distinct nodes in the source code representation. In FIG. 2, shaded nodes represent recorded formatting information and un-shaded nodes represent actual syntax information.

An exemplary embodiment of a translation engine parses the requirements and translates them into the match and assignment operations on an un-shaded node and keeps the shaded nodes. This embodiment analyzes the program representation and identifies nodes representing formatting information. Special actions are assigned to nodes representing formatting information, during the requirement translation process. These special actions guarantee that nodes representing formatting information are retained regardless of the match results. If the transformation rule writer specifies that an old syntax structure is to be replaced with a new syntax structure, the formatting information associated with the old structure is lost. However, the formatting information surrounding the old syntax structure is still retained. In the example shown in FIG. 2, if the syntax structures represented by node A 200 and node B 202 are to be replaced by a different one, the shaded nodes 204 containing formatting information around A and B are still retained. In many cases, this ensures the transformed code has a format similar to the original code.

Figure 3:
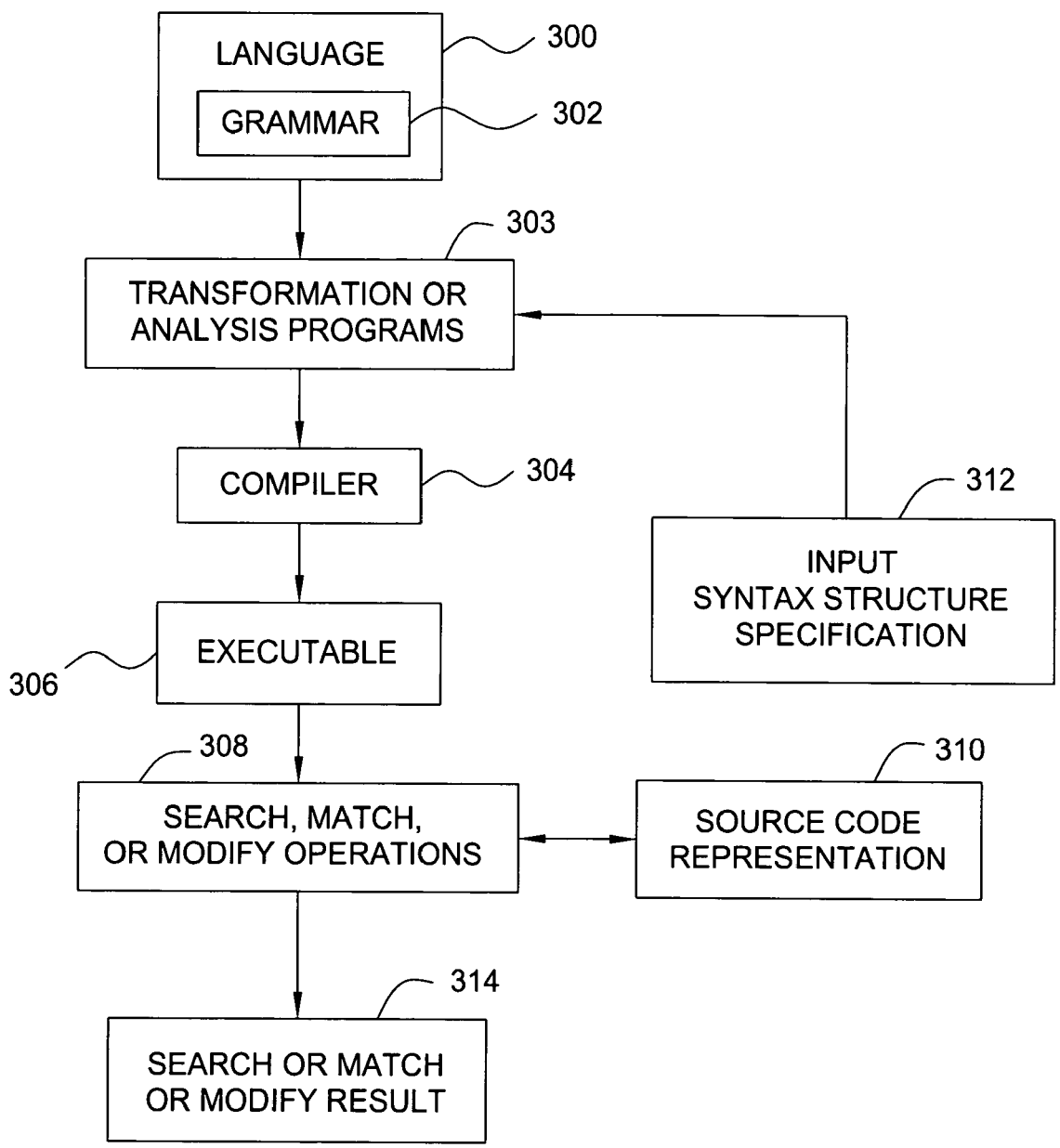
FIG. 3 shows an exemplary method for constructing syntax-directed search and modifications in program transformation systems.

FIG. 3 shows an exemplary method for constructing syntax-directed search and modifications in program transformation systems. A program 303 written in a language 300 specified by a grammar 302 is compiled 304 into an executable 306. The language 300 includes operations 308 for specifying searching, matching, and modifying operations on a source code representation using a syntax structure specification 312. Various results 314 are provided. A search is performed according to a provided syntax structure name and match criteria. When only the syntax name is specified in the syntax structure specification, every occurrence of such syntax structure is matched. A reference to a matched structure is optionally provided.

Figure 4:
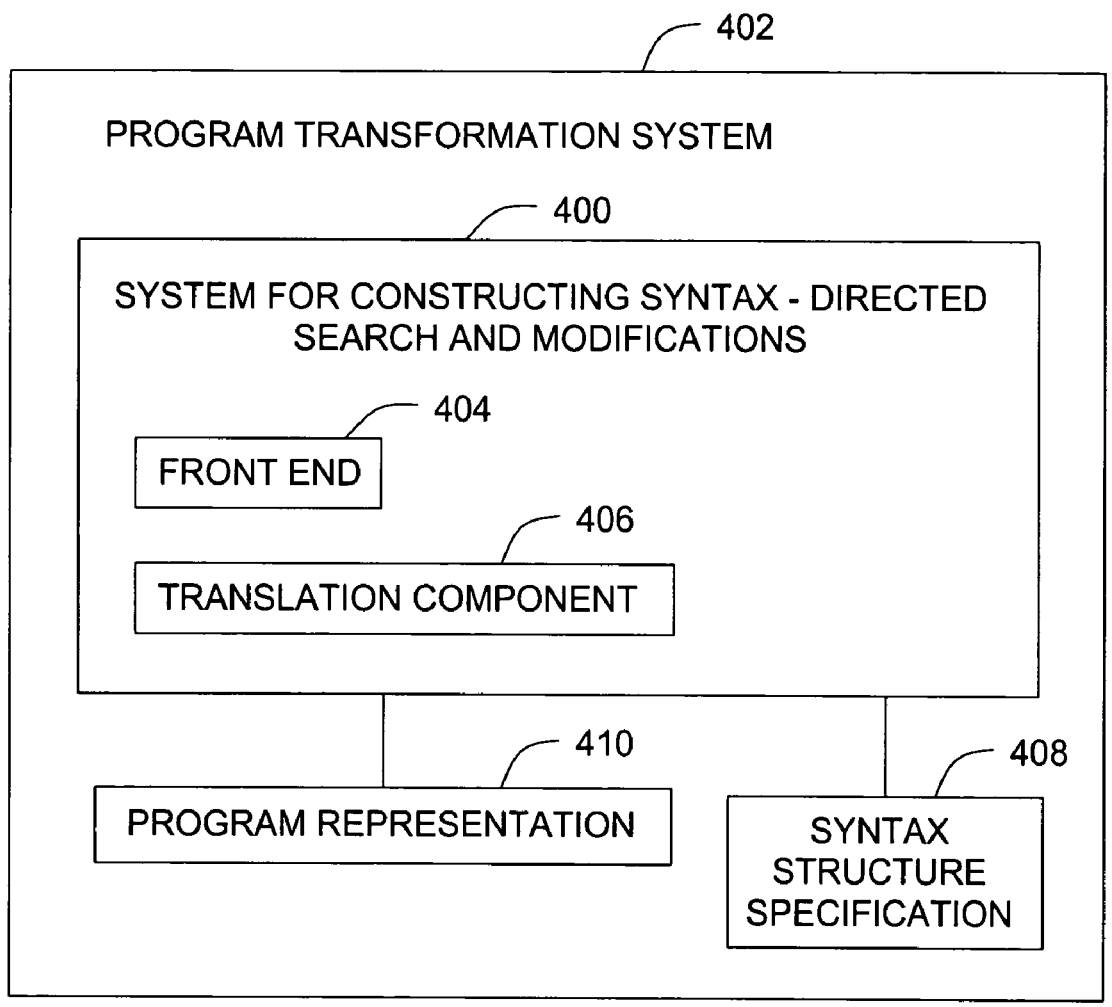
FIG. 4 shows an exemplary system for constructing syntax-directed search and modifications in program transformation systems.

FIG. 4 shows an exemplary system 400 for constructing syntax-directed search and modifications in a program transformation system 402. The system 400 includes a front end 404 and a translation component 406. The front end 400 component receives a syntax structure specification 408 and an action to take when the syntax structure 408 is found in a program representation 410. The translation component 406 performs a method of translating the syntax structure specification into query and manipulation commands on the program representation.

Figure 5:
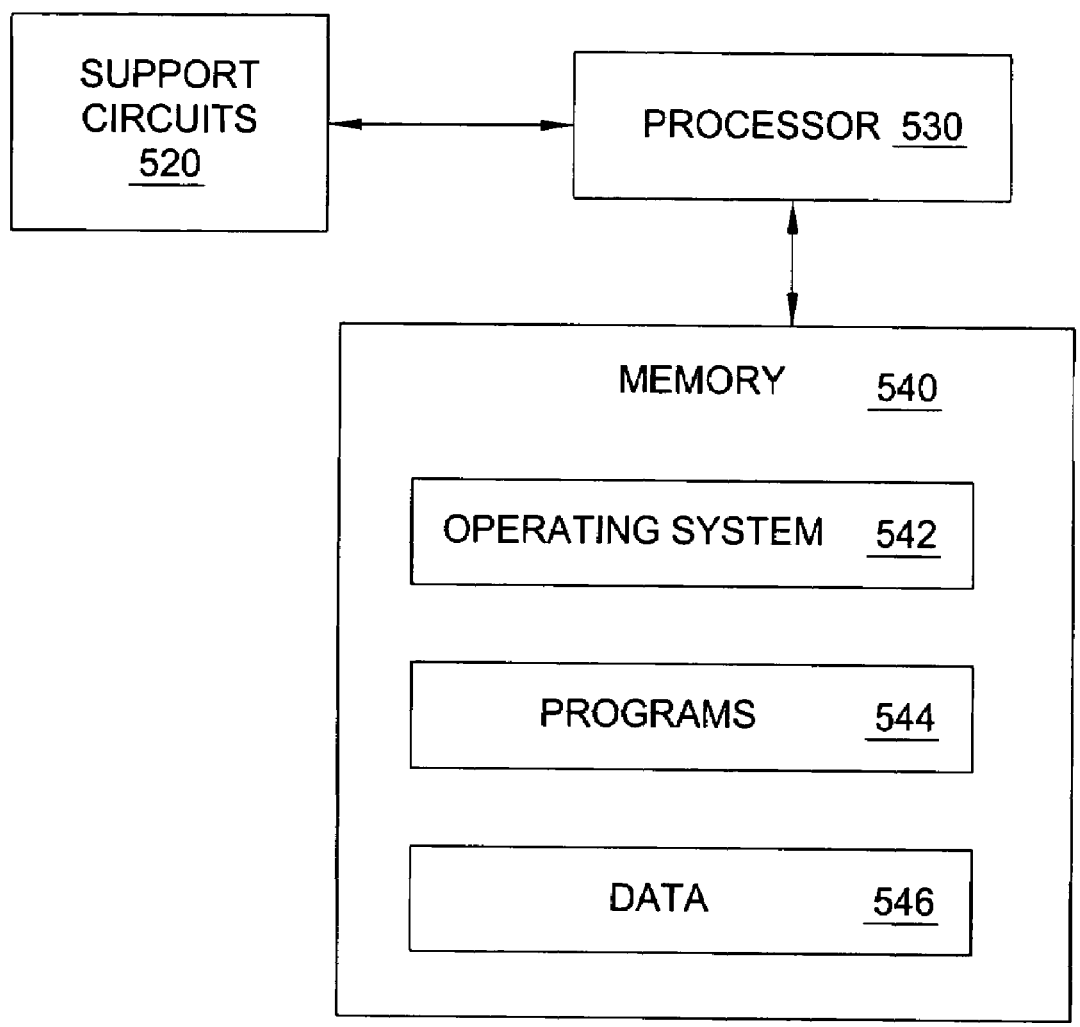
FIG. 5 is a high level block diagram showing a computer.

FIG. 5 is a high level block diagram showing a computer. The computer 500 may be employed to implement embodiments of the present invention. The computer 500 comprises a processor 530 as well as memory 540 for storing various programs 544 and data 546. The memory 540 may also store an operating system 542 supporting the programs 544.

The processor 530 cooperates with conventional support circuitry such as power supplies, clock circuits, cache memory and the like as well as circuits that assist in executing the software routines stored in the memory 540. As such, it is contemplated that some of the steps discussed herein as software methods may be implemented within hardware, for example, as circuitry that cooperates with the processor 530 to perform various method steps. The computer 500 also contains input/output (I/O) circuitry that forms an interface between the various functional elements communicating with the computer 500.

Although the computer 500 is depicted as a general purpose computer that is programmed to perform various functions in accordance with the present invention, the invention can be implemented in hardware as, for example, an application specific integrated circuit (ASCI) or field programmable gate array (FPGA). As such, the process steps described herein are intended to be broadly interpreted as being equivalently performed by software, hardware, or a combination thereof.

The present invention may be implemented as a computer program product wherein computer instructions, when processed by a computer, adapt the operation of the computer such that the methods and/or techniques of the present invention are invoked or otherwise provided. Instructions for invoking the inventive methods may be stored in fixed or removable media, transmitted via a data stream in a broadcast media or other signal bearing medium, and/or stored within a working memory within a computing device operating according to the instructions.

The previously described embodiments of the present invention have many advantages. First, exemplary embodiments allow for flexible syntax based search and manipulation of program representation without losing program format. Some existing works allow syntax based search, but loose format information. Others do preserve format information, but do not support syntax-directed search/manipulation. Second, the search operation is atomic and does not have undesired side effects. Specifically, if both matching conditions and assignments are both specified in the match clause, the assignment does not have any effect, unless all matching conditions are met. Third, formatting information is hidden from the transformation rule writers and can be truthfully preserved. Although other tools do allow format information hiding in the transformation rules, style preservation is not actually achieved.

While the foregoing is directed to various embodiments of the present invention, other and further embodiments of the invention may be devised without departing from the basic scope thereof. As such, the appropriate scope of the invention is to be determined according to the claims, which follow.

What is claimed is:

1. A method for constructing syntax-directed search and modifications in program transformation systems, comprising: compiling a program, generated using a language specified by a grammar, into an executable, the language including at least one command for specifying any of searching, matching, and modifying operations on a source code representation using a syntax structure specification; and executing the executable on the source code representation to generate a target code representation, the executable configured to preserve format information of the source code representation by using program representations that preserve both syntax and formatting information of programs, wherein the executing comprises: searching based on the syntax structure specification and match criteria to match every occurrence of a syntax name in the source code representation, when only the syntax name is specified in the syntax structure specification.

2. The method of claim 1, wherein the executing further comprises:
matching a syntax structure of the source code representation according to match attributes specified in the syntax structure specification.

3. The method of claim 1, wherein the executing further comprises:
replacing a syntax structure of the source code representation matching the syntax name with a replacement syntax structure, when a replace match action is specified in the syntax structure specification.

4. The method of claim 1, wherein, when multiple match criteria are specified in the syntax structure specification, no action is performed unless all of the multiple match criteria are met.

5. A computer readable storage medium storing instructions which, when executed by a processor, cause the processor to perform a method for constructing syntax-directed search and modifications in program transformation systems, comprising: receiving, at a front end component, a syntax structure specification comprising a syntax structure, the syntax structure being associated with an action to be taken when the syntax structure is found in a source code representation by using program representations that preserve both syntax and formatting information of programs; and translating the syntax structure specification into at least one command for querying and manipulating on the source code representation to construct atomic syntax-directed search and modifications on the source code such that format information of the source code is preserved.

6. The computer readable storage medium of claim 5, wherein the source code representation is an abstract syntax tree (AST).

7. The computer readable storage medium of claim 5, wherein the syntax structure specification is defined using a grammar comprising:
    a syntax search, for identifying a syntax structure, being a syntax name followed by a colon.

8. The computer readable storage medium of claim 7, wherein the syntax name is a string.

9. The computer readable storage medium of claim 7, wherein the colon is followed by at least one match action.

10. The computer readable storage medium of claim 9, wherein the at least one match action is either one match action or a comma-separated list of match actions.

11. The computer readable storage medium of claim 9, wherein the match action is a left curly bracket ({) followed by at least one match criteria followed by a right curly bracket (}).

12. The computer readable storage medium of claim 11, wherein the right curly bracket is followed by a left angle bracket (<) followed by at least one match attribute followed by a right angle bracket (>).

13. The computer readable storage medium of claim 11, wherein the at least one match criteria is either one match criteria or a comma-separated list of match criteria.

14. The computer readable storage medium of claim 11, wherein the match criteria is selected from: an equals sign (=) followed by a dollar sign ($) followed by an id, an equals sign (=) followed by an asterisk (*) followed by an id, a single quote (') followed by a string, a dollar sign ($) followed by an id, or an asterisk (*) followed by an id.

15. The computer readable storage medium of claim 12, wherein the at least one match attribute is either one match attribute or a comma-separated list of match attributes.

16. The computer readable storage medium of claim 15, wherein the match attribute is a string.

17. The computer readable storage medium of claim 5, wherein the syntax structure specification is defined using a grammar comprising:

```
syntax_search = syntax_name ': match_actions
syntax_name = string
match_actions = match_action
              | match_action ': match_actions
              |
match_action = '{match_crits'}
             | '{match_crit'}'<match_attrs'>
match_crits = match_crit
            | match_crit', match_crits
```

-continued

```
match_crit = '='$id
           | '='*id
           | "string
           | '$id
           | '*id
match_attrs = match_attr
            | match_attr', match_attrs
match_attr = string.
```

18. The computer readable storage medium of claim 5, wherein the translating further comprises:
    searching, in the source code representation, for all occurrences of a syntax name, identifying the syntax structure to match a source code representation syntax structure to the syntax structure, when only the syntax name is specified in the syntax structure specification; and
    providing a reference to the matched source code representation syntax structure.

19. The computer readable storage medium of claim 18, wherein the translating further comprises:
    replacing a source code representation syntax structure with a replacement syntax structure, when the syntax name matches the source code representation syntax structure and a replace match action is specified in the syntax structure specification.

20. The computer readable storage medium of claim 19, wherein the translating further comprises:
    using the reference and an on clause to replace the source code representation syntax structure matching the syntax name.

21. The computer readable storage medium of claim 18, wherein, when multiple match criteria are specified in the syntax structure specification, no action is performed unless all of the match criteria are met.

22. A computer-readable storage medium having instructions stored thereon which, when executed by a processor, perform a method for constructing syntax-directed search and modifications in program transformation systems, the method comprising: compiling a program, generated using a language specified by a grammar into an executable, the language including at least one command for specifying any of searching, matching, and modifying operations on a source code representation using a syntax structure specification; and executing the executable on the source code representation to generate a target code representation, the executable configured to preserve format information of the source code representation by using program representations that preserve both syntax and formatting information of programs, wherein the executing comprises: searching based on the syntax structure specification and match criteria to match every occurrence of a syntax name in the source code representation, when only the syntax name is specified in the syntax structure specification.

23. The computer-readable medium of claim 22, wherein the method for constructing syntax-directed search and modifications in program transformation systems further comprises:
    providing a reference to a matched syntax structure of the source code representation.

24. The method of claim 1, further comprising:
    providing a reference to a matched syntax structure of the source code representation.

25. The method of claim 24, further comprising:
    using the reference and an on clause to replace the matched syntax structure.

* * * * *